(12) United States Patent
Hirashita et al.

(10) Patent No.: US 10,336,198 B2
(45) Date of Patent: Jul. 2, 2019

(54) CHARGE CABLE LOCK DEVICE

(71) Applicant: KABUSHIKI KAISHA TOKAI RIKA DENKI SEISAKUSHO, Aichi (JP)

(72) Inventors: Takahiro Hirashita, Aichi (JP); Keiji Kahara, Aichi (JP); Hiroshi Aoyama, Aichi (JP); Eiji Kitano, Toyota (JP); Masaru Sasaki, Toyota (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 173 days.

(21) Appl. No.: 15/604,688

(22) Filed: May 25, 2017

(65) Prior Publication Data
US 2017/0341523 A1   Nov. 30, 2017

(30) Foreign Application Priority Data

May 26, 2016 (JP) .................................. 2016-105224

(51) Int. Cl.
*H02J 7/00* (2006.01)
*B60L 11/18* (2006.01)
*B60L 53/16* (2019.01)

(52) U.S. Cl.
CPC ........... *B60L 11/1818* (2013.01); *B60L 53/16* (2019.02); *H02J 7/0027* (2013.01); *H02J 7/0045* (2013.01); *B60L 2270/34* (2013.01); *Y02T 10/7005* (2013.01); *Y02T 10/7072* (2013.01); *Y02T 90/14* (2013.01)

(58) Field of Classification Search
CPC .... B60L 11/1818; H02J 7/0027; H02J 7/0045

USPC .......................................... 320/107; 439/304
See application file for complete search history.

(56) References Cited

U.S. PATENT DOCUMENTS

| 2011/0034053 A1* | 2/2011 | Matsumoto ........... B60L 3/0069 |
| | | 439/304 |
| 2011/0294328 A1 | 12/2011 | Katagiri et al. |
| 2012/0083148 A1 | 4/2012 | Hirashita et al. |
| 2013/0049972 A1 | 2/2013 | Pusch et al. |
| 2014/0167696 A1 | 6/2014 | Kahara et al. |

(Continued)

FOREIGN PATENT DOCUMENTS

| DE | 102012214754 A1 | 2/2013 |
| JP | 2012-079503 A | 4/2012 |
| WO | 2016098558 A1 | 6/2016 |

OTHER PUBLICATIONS

Extended European Search Report dated Dec. 15, 2017 issued in European Patent application No. 17172438.8.

*Primary Examiner* — Paul Dinh

(57) ABSTRACT

A charge cable lock device is for use with an inlet that includes an inlet housing. A charge cable including a rocking arm with a hooking portion is connected in a removable manner to the inlet. The charge cable lock device includes a lock member, a lock housing, and a fixing pin. The lock member is movable to a lock position and an unlock position and configured to contact the rocking arm to restrict disengagement of the hooking portion of the rocking arm from the inlet when the lock member is located at the lock position. The lock housing supports the lock member. The fixing pin is configured to be inserted into the lock housing and the inlet housing and fix the lock housing to the inlet traversing the lock housing and the inlet housing.

11 Claims, 4 Drawing Sheets

(56) References Cited

U.S. PATENT DOCUMENTS

2014/0170879 A1\* 6/2014 Kahara ................ B60L 1/003
 439/304
2014/0170889 A1 6/2014 Kahara et al.
2017/0338594 A1 11/2017 Matsuda et al.

\* cited by examiner

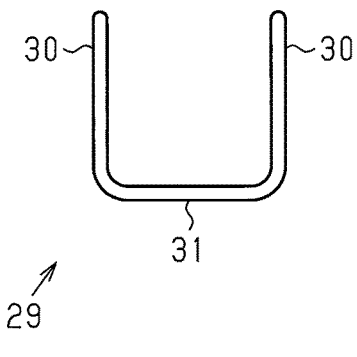
Fig.3A
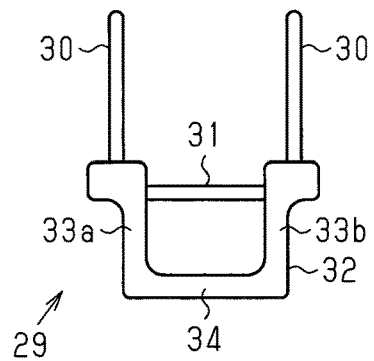
Fig.3B
Fig.4
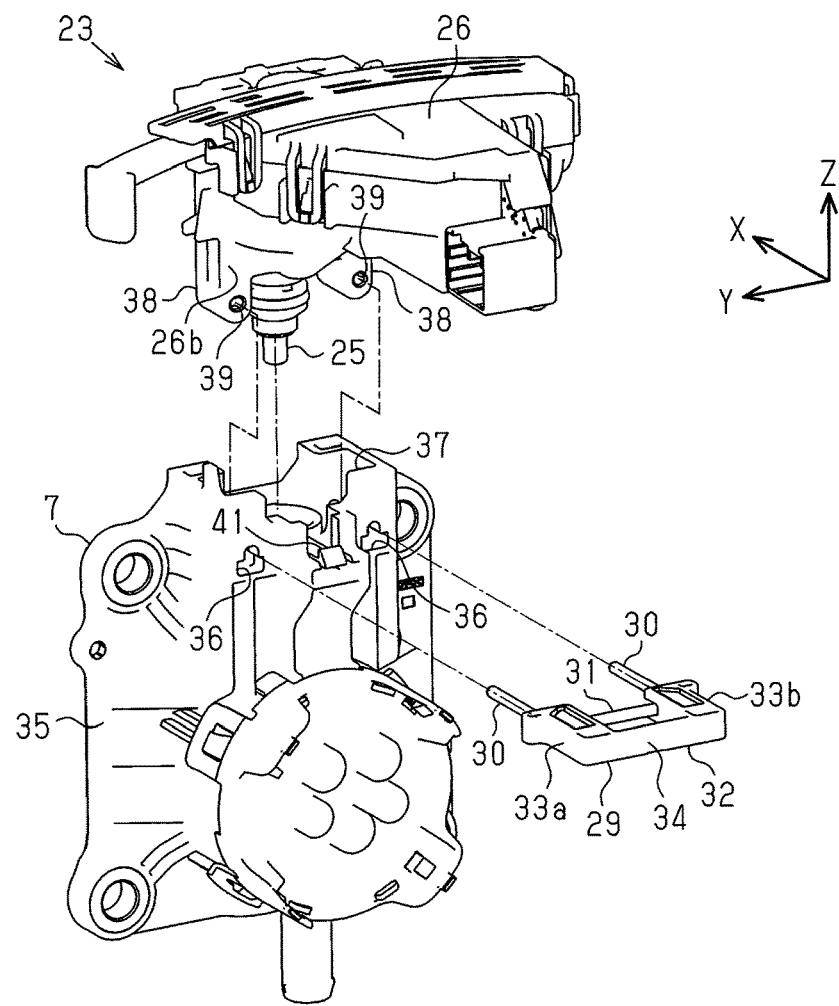

CHARGE CABLE LOCK DEVICE

CROSS-REFERENCE TO RELATED APPLICATIONS

This application is based upon and claims the benefit of priority from prior Japanese Patent Application No. 2016-105224, filed on May 26, 2016, the entire contents of which are incorporated herein by reference.

BACKGROUND

The present invention relates to a charge cable lock device configured to lock a charge cable to an inlet.

A charge cable including a charge connector (charge plug) is used to charge a battery of, for example, a plug-in hybrid vehicle or an electric vehicle. The charge cable connects a charge system to an inlet arranged in a vehicle body. A power switch arranged on the charge cable is switched on to initiate charging. A charge cable lock device locks a charge cable to an inlet to prevent theft of the charge cable when charging is performed (refer to Japanese Laid-Open Patent Publication No. 2012-079503).

SUMMARY

It is an object of the present invention to improve the efficiency for coupling the charge cable lock device to the inlet.

The invention, in one aspect, features a charge cable lock device for use with an inlet that includes an inlet housing. A charge cable including a rocking arm with a hooking portion is connected in a removable manner to the inlet. The charge cable lock device includes a lock member, a lock housing, and a fixing pin. The lock member is movable to a lock position and an unlock position and configured to contact the rocking arm to restrict disengagement of the hooking portion of the rocking arm from the inlet when the lock member is located at the lock position. The lock housing supports the lock member. The fixing pin is configured to be inserted into the lock housing and the inlet housing and fix the lock housing to the inlet traversing the lock housing and the inlet housing.

In this structure, the charge cable lock device is coupled and fixed to the inlet through a simple task of inserting the fixing pin with the fixing pin traversing the lock housing and the inlet housing. This improves the efficiency for coupling the charge cable lock device to the inlet.

In some embodiments, the fixing pin includes a finger grip. In this structure, when coupling the charge cable lock device to the inlet, the fixing pin can be handled by holding the finger grip. Since the fixing pin is easy to hold, the efficiency for coupling the charge cable lock device to the inlet is improved.

In some embodiments, the lock housing and the inlet housing are configured such that the fixing pin is inserted from a back side of the lock housing to traverse the lock housing and the inlet housing.

In this structure, the coupled fixing pin is concealed by the back side of the lock housing. This prevents or restricts unauthorized removal of the fixing pin.

In some embodiments, the fixing pin includes a distal linear portion that is parallel to the second axis, and the distal linear portion is configured to be fitted to the inlet housing and the lock housing in the first insertion hole and the second insertion hole, respectively.

In this structure, the two supports maintain the coupled state of the lock housing and the inlet housing at two points. This is advantageous for fixing and coupling the charge cable lock device to the inlet.

In some embodiments, the inlet housing includes a fastener that engages the fixing pin when the fixing pin reaches a completely inserted position and positions the fixing pin at the completely inserted position.

In this structure, the fastener maintains the fixing pin at the completely inserted position. This prevents or restricts separation of the fixing pin.

In several aspects of the present invention, the efficiency for coupling the charge cable lock device to the inlet is improved. Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 3A is a plan view showing a fixing pin prior to the formation of a finger grip;

FIG. 3B is a plan view showing the fixing pin subsequent to the formation of the finger grip;

FIG. 4 is a perspective view showing a process for coupling and fixing the charge cable lock device to the inlet with the fixing pin;

DETAILED DESCRIPTION OF THE PREFERRED EMBODIMENTS

One embodiment of a charge cable lock device will now be described.

Figure 1:
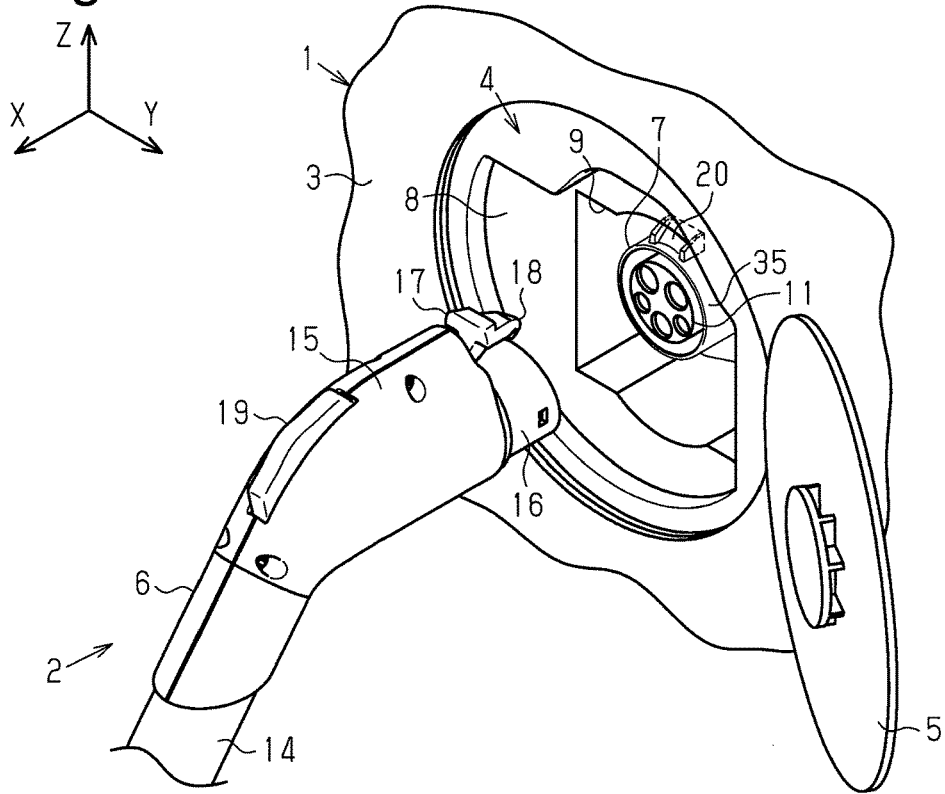
FIG. 1 is a perspective view showing a charge cable and an inlet.

FIG. 1 shows a battery-installed vehicle 1 such as a plug-in hybrid vehicle or an electric vehicle. A charge system 2 that charges the battery (not shown) of the vehicle 1 includes a charge cable 6, which is connected to an external charging facility (i.e., household power supply or charging station), and an inlet 7 arranged in the vehicle 1. A user connects the charge cable 6 to the inlet 7 when charging the battery of the vehicle 1 and disconnects the charge cable 6 from the inlet 7 when the battery of the vehicle 1 has been charged.

The vehicle 1 includes a power supplying port 4 arranged in a vehicle body 3 and a lid 5 that is pivotally supported by the vehicle body 3 to close the power supplying port 4. The inlet 7 may include a frame 8 that is fixed to the vehicle body 3. The inlet 7 includes a power receiving terminal 11 supported by the frame 8. In the illustrated example, the power receiving terminal 11 is arranged in a hole 9 of the frame 8.

The charge cable 6 includes a cable 14 and a charge connector 15 located at a distal end of the cable 14. The charge connector 15 includes a distal end having, for example, a power supplying terminal 16. The charge connector 15 is fitted to the inlet 7 to electrically connect the power supplying terminal 16 of the charge connector 15 to the power receiving terminal 11 of the inlet 7.

The charge cable 6 includes a rocking arm 17 that is pivotally supported by the charge connector 15. The rocking arm 17 includes a distal end defining a hooking portion 18 and a basal end defining a user-operated portion 19. The user-operated portion 19 is manually operated by a user to move the hooking portion 18. The charge connector 15 may include a biasing element that biases and closes the hooking portion 18 of the rocking arm 17. When the charge connector 15 is sufficiently or completely fitted to the inlet 7, the hooking portion 18 of the rocking arm 17 physically engages a seat 20 of the inlet 7. When the user operates the user-operated portion 19 against the biasing force of the biasing element, the rocking arm 17 is pivoted. This disengages the hooking portion 18 of the rocking arm 17 from the seat 20 of the inlet 7.

Figure 2A:
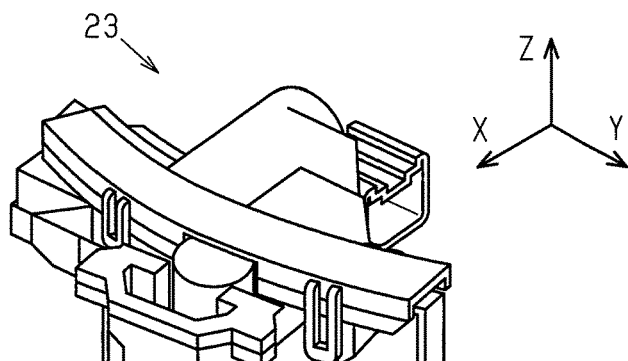
FIG. 2A is a perspective view showing a charge cable lock device according to one aspect of the present invention.
Figure 2B:
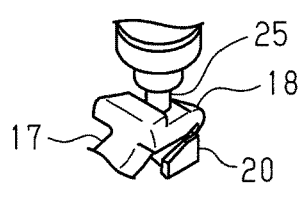
FIG. 2B is an enlarged perspective view of a lock member of the charge cable lock device shown in FIG. 2A, a rocking arm of the charge cable, and a seat of an inlet.

FIGS. 2A and 2B each show a charge cable lock device 23 configured to lock the charge cable 6 (charge connector 15) to the inlet 7 when the charge cable 6 is connected to the inlet 7 of the vehicle 1. The charge cable lock device 23 includes a lock housing 26 and a lock member 25 supported by the lock housing 26. The lock housing 26 includes a front surface 26a, which is located toward an outer side of the vehicle, and a back surface 26b, which is located toward an inner side of the vehicle. The front surface 26a and the back surface 26b may be referred to as a front side and a back side of the lock housing 26. The lock member 25 is movable between a lock position and an unlock position. For example, the lock housing 26 accommodates an actuator and a gear mechanism to move the lock member 25.

The lock member 25 is, for example, downwardly projected from the lock housing 26, as viewed in FIG. 2A, and held at the lock position. The lock member 25 is, for example, upwardly retracted, as viewed in FIG. 2A, and held at the unlock position. The lock member 25 contacts, from above, the hooking portion 18 of the rocking arm 17 that is hooked to the seat 20 of the inlet 7 to restrict pivoting of the rocking arm 17. This locks the charge cable 6 to the inlet 7.

A fixing pin 29 that couples and fixes the charge cable lock device 23 to the inlet 7 will now be described with reference to FIGS. 3A and 3B. The fixing pin 29 is U-shaped. For example, the fixing pin 29 includes two supports 30 and a bridge 31 that connects the supports 30. The two supports 30 linearly extend parallel to each other. Each support 30 includes a free end that functions as a dowel or a key as discussed below. In some embodiments, the support 30 is a straight rod having a smooth outer surface and is free from a threaded outer surface. The portion in which each support 30 and the bridge 31 are connected forms a corner. The supports 30 and the bridge 31 may be a one-piece component.

As shown in FIG. 3B, the fixing pin 29 can include a finger grip 32. The finger grip 32 is shaped so that it can be manually held. The finger grip 32 may be, for example, a synthetic resin component. The finger grip 32 may be coupled to the basal ends of the two supports 30. The finger grip 32 is U-shaped. For example, the finger grip 32 includes legs 33a and 33b respectively coupled to the two corners of the fixing pin 29 and a bridge 34 that couples the legs 33a and 33b. In the example of FIG. 3B, the legs 33a and 33b and the bridge 34 form a loop in cooperation with the bridge 31. The loop may define an empty space.

FIG. 4 is a rear view of the inlet 7. The inlet 7 includes an inlet housing 35. The inlet housing 35 may be the frame 8 itself or a separate inlet housing fixed to the frame 8. Two insertion holes 36 into which the supports 30 of the fixing pin 29 are inserted extend through a back surface of the inlet housing 35. The inlet housing 35 includes a coupling receptacle 37 that opens in an upper portion of the inlet housing 35. The coupling receptacle 37 of the inlet housing 35 receives two coupling portions 38 that may be defined by a lower portion of the lock housing 26. Two insertion holes 39 into which the supports 30 of the fixing pin 29 are inserted extend through the two coupling portions 38. In the illustrated example, the coupling receptacle 37 includes an axis that is parallel to a Z axis, and each of the insertion holes 36 and 39 includes an axis that is parallel to an X axis.

When the two coupling portions 38 of the charge cable lock device 23 are completely inserted into the coupling receptacle 37 of the inlet housing 35, the insertion holes 36 of the inlet housing 35 are opposed to the insertion holes 39 of the lock housing 26. In other words, the insertion holes 36 are concentrically aligned with the insertion holes 39. This forms linear key grooves. The key grooves (36, 39) do not open at the front side of the inlet 7 and may be open only at the back side of the inlet 7. The supports 30 of the fixing pin 29, which may serve as keys, are inserted to and tightly fitted into the key grooves.

In the illustrated example, the lock member 25 is located between the two coupling portions 38 of the lock housing 26. The lock member 25 and the coupling portions 38 are received by the coupling receptacle 37 of the inlet housing 35. The coupling portions 38 of the lock housing 26 are inserted, from above, into the coupling receptacle 37 of the inlet housing 35, for example, in a direction parallel to a longitudinal axis of the lock member 25 or a direction in which the lock member 25 reciprocates (Z axis). The axes (X axis) of the insertion holes 36 of the inlet housing 35 and the insertion holes 39 of the lock housing 26 intersect or extend orthogonal to the longitudinal axis of the lock member 25 or the reciprocating direction of the lock member 25 (Z axis).

Figure 5:
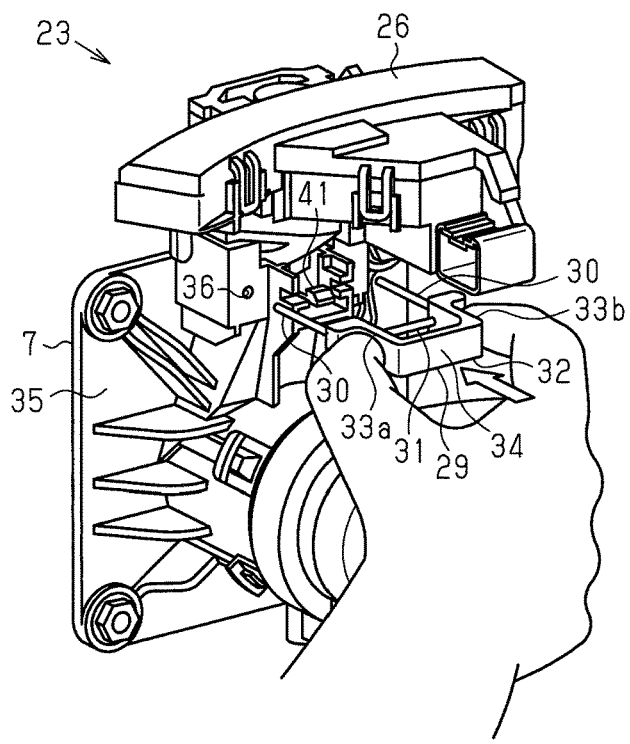
FIG. 5 is a perspective view showing the insertion of the fixing pin.

The insertion of the fixing pin 29 traversing the lock housing 26 and the inlet housing 35 couples and fixes the charge cable lock device 23 to the inlet 7. As shown in FIGS. 4 and 5, the fixing pin 29 is coupled from the back side of the lock housing 26. The two supports 30 of the fixing pin 29 support each of the lock housing 26 and the inlet housing 35 at two different points, namely, the two insertion holes 36 of the inlet housing 35 and the two insertion holes 39 of the lock housing 26.

The back surface of the inlet 7 includes a fastener 41. The fastener 41 engages the fixing pin 29 when the fixing pin 29 is coupled to the lock housing 26 and the inlet housing 35 and positions the fixing pin 29 at the engaging position. In the illustrated example, when the fixing pin 29 is located at a completely inserted position, the fastener 41 engages the fixing pin 29 and holds the fixing pin 29 at the completely inserted position (which may be referred to as predetermined position). The fastener 41 is snap-fitted to the inlet housing 35 to fasten the fixing pin 29 to the inlet housing 35.

The coupling operation of the charge cable lock device 23 will now be described.

As shown in FIG. 4, the coupling portions 38 of the lock housing 26 are inserted into the coupling receptacle 37 of the inlet housing 35, for example, from above. This temporarily couples the lock housing 26 to the inlet housing 35. Next, as shown in FIG. 5, the fixing pin 29 is inserted into the lock housing 26 and the inlet housing 35, for example, from the back side. The supports 30 of the fixing pin 29 are fitted into the insertion holes 36 and 39. This couples and fixes the lock housing 26 to the inlet housing 35.

The fixing pin 29 may include the finger grip 32 at the basal end of the fixing pin 29, which is located at the side opposite to the supports 30. The left and right ends of the finger grip 32, for example, the legs 33a and 33b of the finger grip 32, may be held between fingers to fix and couple the lock housing 26 to the inlet housing 35 with the fixing pin 29. Thus, the lock housing 26 may be coupled and fixed to the inlet housing 35 with the fixing pin 29 without the fingers being interfered with by a product (such as charge cable lock device 23). The finger grip 32 of the fixing pin 29 may be formed in a manner that prompts a person to hold the fixing pin 29 in a certain manner. The finger grip 32 improves the efficiency for coupling the charge cable lock device 23 to the inlet housing 35.

Figure 6:
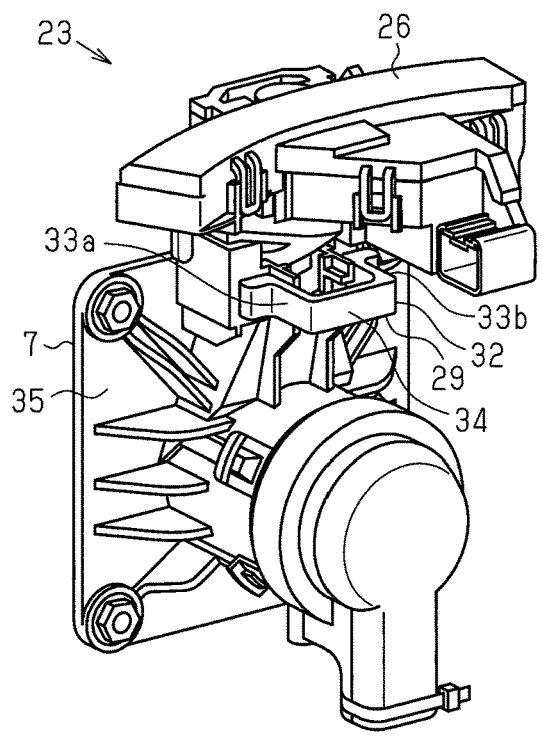
FIG. 6 is a perspective view showing the charge cable lock device and the inlet that are coupled and fixed together by the fixing pin.
Figure 7:
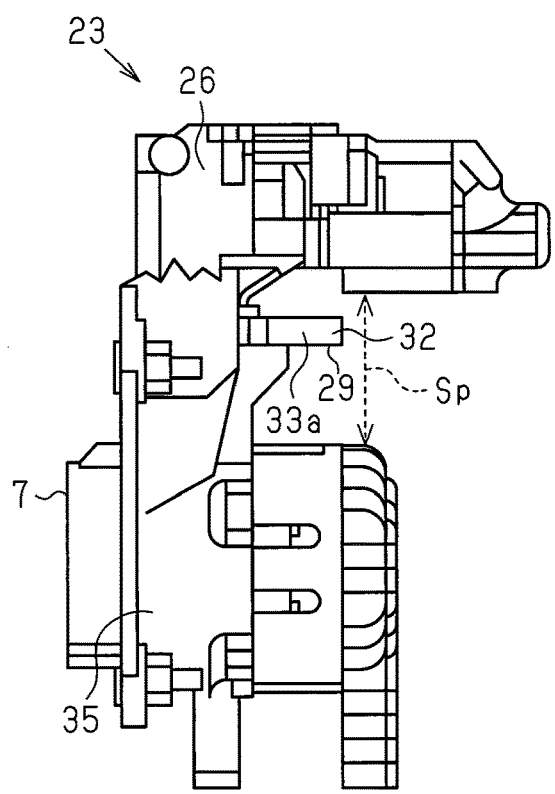
FIG. 7 is a side view of FIG. 6.

As shown in FIGS. 6 and 7, when the fixing pin 29 is located at the completely inserted position, the fastener 41 of the inlet housing 35 engages the fixing pin 29 and fastens the fixing pin 29 at the completely inserted position. For example, when the fixing pin 29 reaches the completely inserted position, the supports 30 of the fixing pin 29 are fitted into the insertion holes 36 and 39 of the lock housing 26 and the inlet housing 35, the distal end surfaces of the legs 33a and 33b contact a wall surface of the inlet housing 35, and the bridge 31 is engaged with the fastener 41. In this manner, the fixing pin 29 fixes and integrates the lock housing 26 and the inlet housing 35. This obtains the inlet 7 to which the charge cable lock device 23 is coupled.

In the present embodiment, the charge cable lock device 23 is coupled and fixed to the inlet 7 through a simple task of inserting the fixing pin 29 with the fixing pin 29 traversing the lock housing 26 and the inlet housing 35. This improves the coupling efficiency of the charge cable lock device 23.

The fixing pin 29 is shaped to be held by fingers. The fixing pin 29 may include the finger grip 32. When coupling and fixing the charge cable lock device 23 to the inlet 7, the finger grip 32 is held with one hand between the fingers. The fixing pin 29 is easy to hold and handle. This improves the efficiency for coupling the charge cable lock device 23 to the inlet 7. The finger grip 32 may be held at the side opposite to the supports 30 of the fixing pin 29. Thus, the fixing pin 29 can be inserted into the holes 36 and 39 of the lock housing 26 and the inlet housing 35 by providing a relatively small coupling space Sp (refer to FIG. 7) that is accessible by fingertips at the back side of the assembly of the lock housing 26 and the inlet housing 35. Thus, the coupling space Sp may be narrowed and, consequently, the inlet 7 to which the charge cable lock device 23 is coupled may be reduced in size.

The fixing pin 29 is inserted into the lock housing 26 from the back side of the lock housing 26. The fixing pin 29 is concealed by the lock housing 26 and cannot be seen from the outside of the power supplying port 4. This prevents or restricts unauthorized removal of the fixing pin 29.

The fixing pin 29 includes the supports 30 that restrict movement of the lock housing 26 relative to the inlet housing 35. Thus, the lock housing 26 is coupled and fixed to the inlet housing 35.

The fixing pin 29 includes the two legs 33a and 33b that are in contact with the inlet housing 35 in a state in which the lock housing 26 is coupled to the inlet housing 35. The two legs 33a and 33b support the lock housing 26 and the inlet housing 35 at two different points. Thus, the charge cable lock device 23 is firmly fixed to the inlet 7.

When the fixing pin 29 reaches the completely inserted position, the fastener 41 of the inlet housing 35 engages the fixing pin 29 and fastens the fixing pin 29 at the completely inserted position. This prevents separation of the fixing pin 29. Consequently, unauthorized removal of the charge cable lock device 23 is restricted.

It should be apparent to those skilled in the art that the present invention may be embodied in many other specific forms without departing from the spirit or scope of the invention. Particularly, it should be understood that the present invention may be embodied in the following forms.

Figure 8:
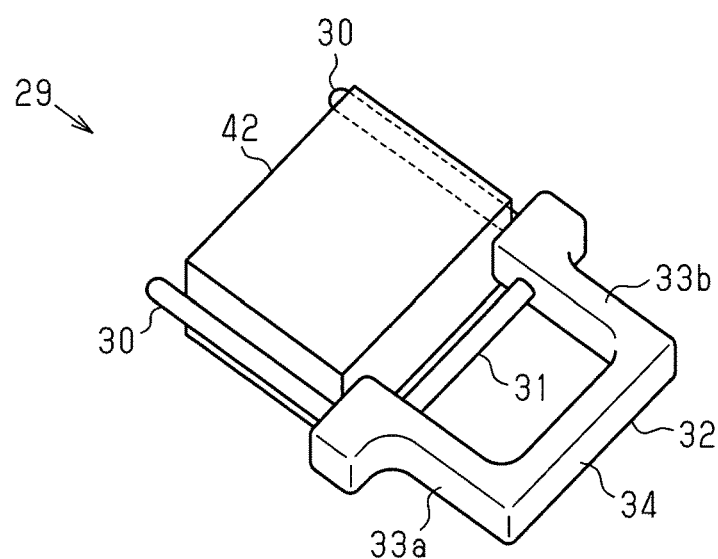
FIG. 8 is a perspective view showing another example of a fixing pin.

As shown in FIG. 8, the fixing pin 29 may include a vibration reducer 42. The vibration reducer 42 reduces vibration that occurs between the inlet 7 and the charge cable lock device 23 that are coupled to each other. The vibration reducer 42, which is formed from, for example, a synthetic resin, may be arranged between the two supports 30 and the bridge 31. The vibration reducer 42 may be a cushion that generates elastic repulsion force. When the fixing pin 29 includes the vibration reducer 42, the vibration reducer 42 reduces vibration and limits the occurrence of noise or the like.

It is preferred that the fixing pin 29 be inserted from the back side of the lock housing 26. However, the inlet housing 35 and the lock housing 26 may be configured so that the fixing pin 29 is inserted from a side other than the back surface of the lock housing 26 such as the right side or the left side of the lock housing 26.

It is preferred that the supports 30 and the bridge 31 of the fixing pin 29 be formed from a metal and that the finger grip 32 be formed from a synthetic resin. However, the materials of the supports 30, the bridge 31, and the finger grip 32 of the fixing pin 29 can be changed if necessary. For example, the supports 30, the bridge 31, and the finger grip 32 may be a one-piece component formed from a metal or a synthetic resin.

The shape of the fixing pin 29 may be changed if necessary. As long as the fixing pin 29 is configured to fix the charge cable lock device 23 to the inlet 7, the fixing pin 29 may have any shape or structure. In several examples, the fixing pin 29 may include only one support 30. In other examples, the finger grip 32 of the fixing pin 29 may be omitted.

The charge cable lock device 23 does not have to be coupled to the inlet housing 35 from above. In the illustrated example, the charge cable lock device 23 is coupled to the inlet housing 35 in a direction that is parallel to the movement direction of the lock member 25. In another example, the charge cable lock device 23 may be coupled to the inlet housing 35 in a direction that is not parallel to the movement direction of the lock member 25, for example, a direction that is orthogonal to the movement direction of the lock member 25.

As long as the lock member 25 of the charge cable lock device 23 is configured to keep the rocking arm 17 and the seat 20 of the inlet 7 engaged, the shape and movement of the lock member 25 may be changed. In the illustrated example, the lock position and the unlock position of the lock member 25 are switched by linearly reciprocating the lock member 25. In another example, the lock member 25 is configured to switch the lock position and the unlock position of the lock member 25 by pivoting or rotating the lock member 25 instead of linearly reciprocating the lock member 25. The inlet 7 may have any shape.

The charge cable lock device 23 is configured to electrically drive the lock member 25. However, in another example, the charge cable lock device 23 may be configured so that the user manually switches the position of the lock member 25 to the lock position and the unlock position.

The present disclosure includes the following implementation(s).

Implementation 1

A fixing pin that is used with an inlet to which a charge cable is connected and fixes and couples a charge cable lock device to the inlet, wherein the charge cable lock device includes a lock member that contacts the rocking arm to restrict disengagement of a hooking portion of a rocking arm of the charge cable from the inlet, and the fixing pin is configured to be inserted into a lock housing that supports the lock member and an inlet housing of the inlet traversing the lock housing and the inlet housing.

The present examples and embodiments are to be considered as illustrative and not restrictive, and the invention is not to be limited to the details given herein, but may be modified within the scope and equivalence of the appended claims. For example, one or more of the components may be omitted from the components described in the embodiments (or one or more aspects thereof). Components in different embodiments may be appropriately combined.

The invention claimed is:

1. A charge cable lock device for use with an inlet that includes an inlet housing, wherein a charge cable including a rocking arm with a hooking portion is connected in a removable manner to the inlet, the charge cable lock device comprising:
a lock member movable to a lock position and an unlock position, wherein the lock member is configured to contact the rocking arm to restrict disengagement of the hooking portion of the rocking arm from the inlet when the lock member is located at the lock position;
a lock housing that supports the lock member; and
a fixing pin configured to be inserted into the lock housing and the inlet housing and fix the lock housing to the inlet traversing the lock housing and the inlet housing,
wherein the fixing pin includes a metal one-piece component including
distal linear portions that are parallel to each other, and
a bridge that connects the distal linear portions.

2. The charge cable lock device according to claim 1, wherein the fixing pin includes a finger grip.

3. The charge cable lock device according to claim 1, wherein the lock housing and the inlet housing are configured such that the fixing pin is inserted from a back side of the lock housing to traverse the lock housing and the inlet housing.

4. The charge cable lock device according to claim 1, wherein
the fixing pin is U-shaped and includes the distal linear portions as two supports, each having a free end, and
the two supports are configured to fix the lock housing to the inlet housing.

5. The charge cable lock device according to claim 1, wherein the inlet housing includes a fastener that engages the fixing pin when the fixing pin reaches a completely inserted position and positions the fixing pin at the completely inserted position.

6. The charge cable lock device according to claim 1, wherein
the inlet housing includes first insertion holes,
the lock housing includes second insertion holes,
when the lock housing is coupled to the inlet housing, the first insertion holes of the inlet housing and the second insertion holes of the lock housing are concentrically aligned and form linear key grooves, and
the distal linear portions of the fixing pin are fitted into the linear key grooves formed by the first insertion hole and the second insertion hole that are in alignment.

7. The charge cable lock device according to claim 1, wherein the metal one-piece component is U-shaped.

8. An inlet for use with a charge cable including a rocking arm and a power supplying terminal, the inlet comprising:
an inlet housing including
a front side including a power receiving terminal that is electrically connected to the power supplying terminal of the charge cable and a seat that engages the rocking arm, and
a back side including a coupling receptacle having a first axis and a first insertion hole having a second axis that is orthogonal to the first axis;
a lock housing coupled to the coupling receptacle of the inlet housing, wherein the lock housing includes a second insertion hole configured to be concentrically aligned with the first insertion hole to form a linear key groove;
a lock member supported by the lock housing in a movable manner, wherein the lock member maintains the rocking arm in a state engaged with the seat; and
a fixing pin configured to be inserted and fitted into the linear key groove, which is formed by the first insertion hole and the second insertion hole, from the back side of the inlet housing to fix the lock housing to the inlet housing.

9. The inlet according to claim 8, wherein
the fixing pin includes a distal linear portion that is parallel to the second axis, and
the distal linear portion is configured to be fitted to the inlet housing and the lock housing in the first insertion hole and the second insertion hole, respectively.

10. The inlet according to claim 8, wherein
the fixing pin includes distal linear portions that are parallel to the second axis,
the first insertion hole is one of a plurality of first insertion holes of the inlet housing,
the second insertion hole is one of a plurality of second insertion holes of the lock housing,
when the lock housing is coupled to the inlet housing, the first insertion holes of the inlet housing and the second insertion holes of the lock housing are concentrically aligned to form linear key grooves, and
the distal linear portions of the fixing pin are configured to be respectively fitted into the linear key grooves.

11. A charge cable lock device for use with an inlet that includes an inlet housing, wherein a charge cable including a rocking arm with a hooking portion is connected in a removable manner to the inlet, the charge cable lock device comprising:
a lock member movable to a lock position and an unlock position, wherein the lock member is configured to contact the rocking arm to restrict disengagement of the hooking portion of the rocking arm from the inlet when the lock member is located at the lock position;
a lock housing that supports the lock member; and
a fixing pin configured to be inserted into the lock housing and the inlet housing and fix the lock housing to the inlet traversing the lock housing and the inlet housing, wherein the inlet housing includes a fastener that engages the fixing pin when the fixing pin reaches a completely inserted position and positions the fixing pin at the completely inserted position.

* * * * *